July 19, 1949.  W. H. COOK  2,476,356
EGG BREAKER AND SEPARATOR

Filed Dec. 9, 1947  2 Sheets-Sheet 1

INVENTOR.
WILLIAM H. COOK,
BY
McMorrow, Berman & Davidson
ATTORNEYS.

July 19, 1949.  W. H. COOK  2,476,356
EGG BREAKER AND SEPARATOR

Filed Dec. 9, 1947  2 Sheets-Sheet 2

INVENTOR.
WILLIAM H. COOK,
BY
ATTORNEYS.

Patented July 19, 1949

2,476,356

UNITED STATES PATENT OFFICE 2,476,356

EGG BREAKER AND SEPARATOR

William H. Cook, Marco, Fla.

Application December 9, 1947, Serial No. 790,521

1 Claim. (Cl. 146—2)

This invention relates to culinary devices, and more particularly to a kitchen appliance for use in separating the inner parts of an egg from its shell, and for separating the yolk from the white of the egg.

A main object of the invention is to provide a novel and improved egg separating device which is very simple in construction, easy to use, and which enables the user to separate the contents of an egg from its shell without breaking the egg yolk and which also facilitates the efficient separation of the yolk from the white of the egg.

A further object of the invention is to provide an improved egg separator which enables the user to remove the contents of an egg from its shell without loss and in an efficient, clean, and timesaving manner, said separator involving a minimum number of parts and requiring a minimum amount of manual dexterity to operate.

Further objects and advantages of the invention will become apparent from the following description and claim, and from the accompanying drawings, wherein:

Figure 1:
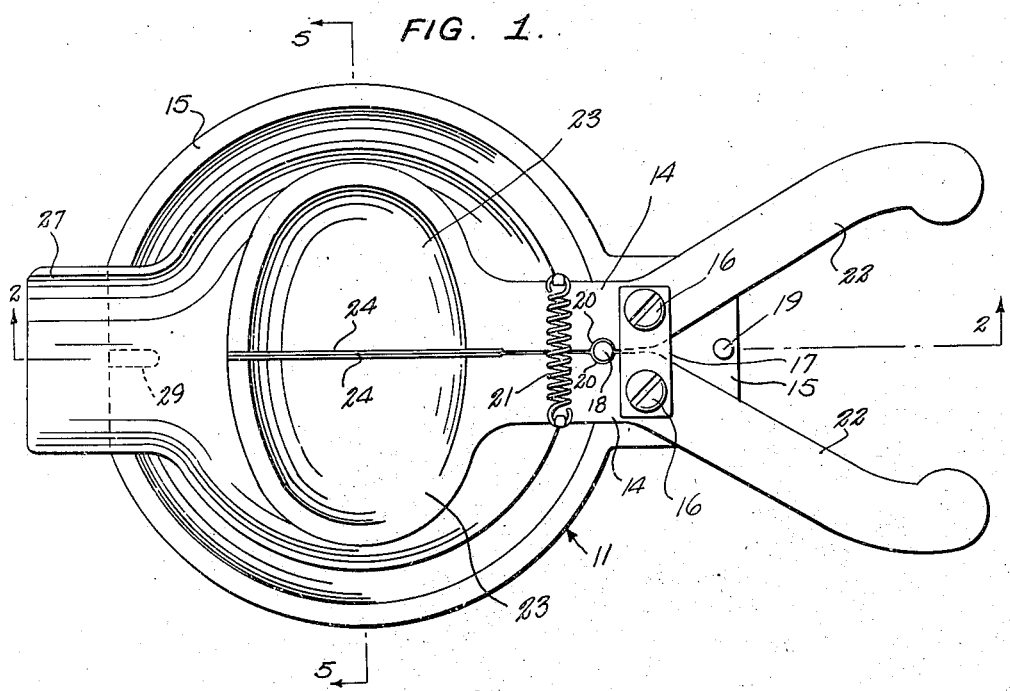
Figure 1 is a top plan view of an egg separator constructed in accordance with the present invention.

Referring to the drawings, 11 designates the base of the apparatus, said base being generally circular and being concave at its upper surface to define a shallow bowl portion 12. Said bowl portion is formed with a plurality of arcuate slots 13 extending through the base, whereby when the contents of an egg fall on said bowl portion, the egg white will flow through the slots 13 and the egg yolk will be retained in the center of the bowl portion. The center of the bowl portion is therefore unperforated and the slots 13 are preferably on the same radius with respect to the center of the base 14, said radius being approximately equal to the radius of an average egg yolk deposited on a flat or shallow dish surface.

Designated at 14, 14 are respective arms, pivotally secured to an extension 15 of the base 11 by vertical bolts shown at 16, 16. A flat rigid washer strip 17 underlies the bolt heads and braces the bolts against bending stresses caused by the operation of the device, as will be subsequently described.

Secured in extension 15 between the arms 14, 14 are upstanding stop pegs 18 and 19, located in the longitudinal vertical central plane of base 11 and on opposite sides of the transverse plane of bolts 16, 16. The arms 14, 14 are recessed at 20, 20 to receive stop peg 18 to bias the arms into abutting engagement with each other at said longitudinal vertical central plane.

At their outer ends the arms 14, 14 are formed with divergent handle portions 22, 22. At their inner ends, said arms are formed with opposed concave cup elements 23, 23. Secured to the abutting edges of the arms at said cup elements are upstanding blades 24, 24, preferably of thin metal, the top edges of the blades being concave, as shown at 25.

Figure 2:
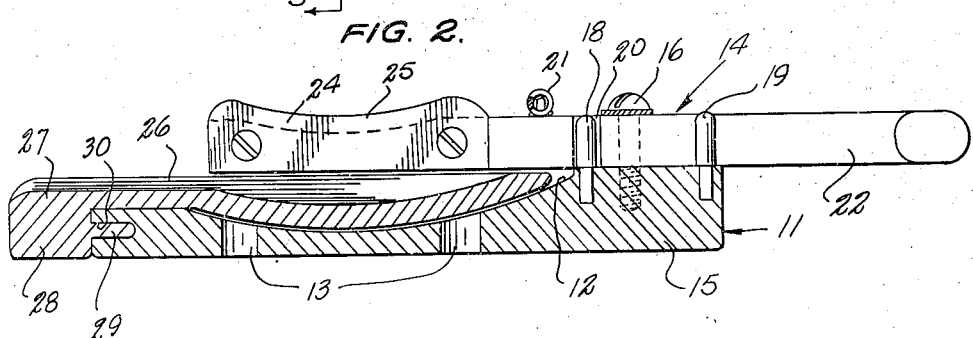
Figure 2 is a longitudinal vertical cross-sectional view taken on line 2—2 of Figure 1.
Figure 3:
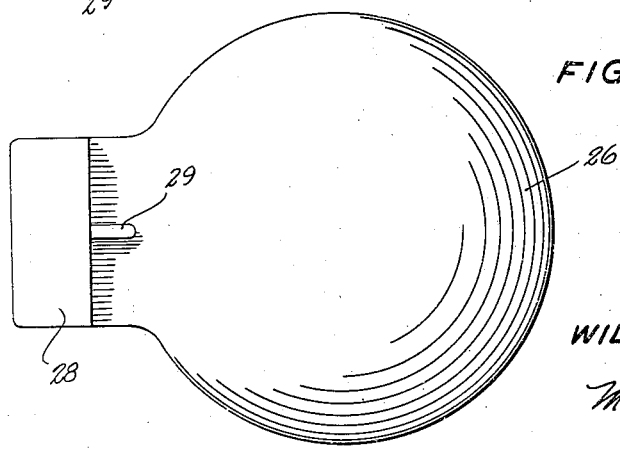
Figure 3 is a bottom plan view of a removable tray employed with the egg separator of Figure 1.

Designated at 26 is a removable tray member shaped to fit into the concave bowl portion 12, said tray member being formed with a trough like extension 27 projecting laterally therefrom. Extension 27 carries a depending block element 28 which is substantially flush at its bottom surface with the bottom surface of base 11. Block 28 carries an inwardly projecting horizontal pin element 29 which is receivable in a recess 30 formed in the edge of base 11. As shown in Figure 2, the tray member 26 is concave and is shaped to snugly nest into the bowl portion 12, covering the arcuate apertures 13. The tray member may be readily removed by pulling it horizontally outwardly from the base 11.

Figure 4:
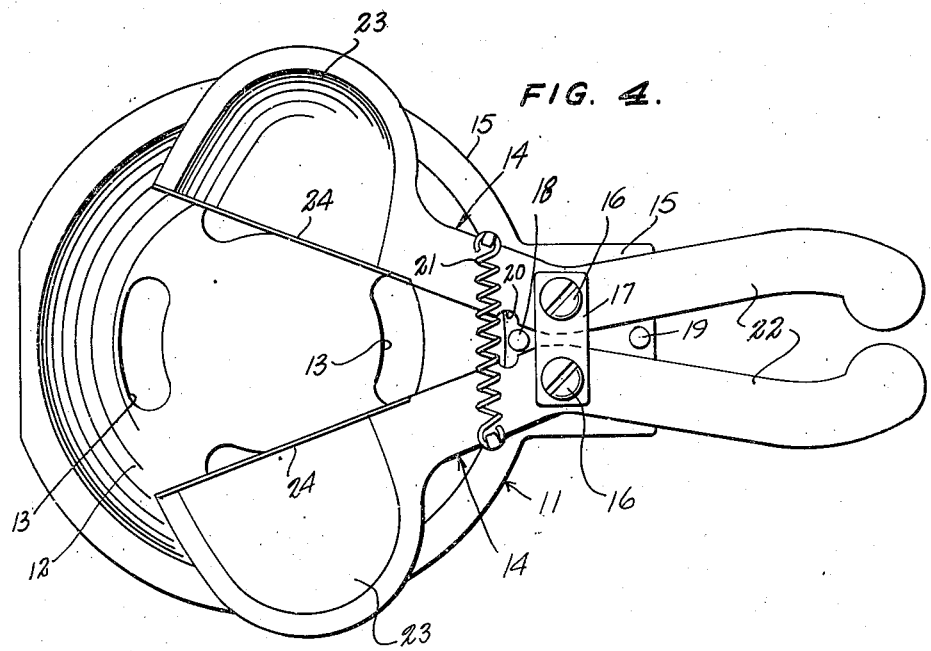
Figure 4 is a plan view of the egg separator of Figure 1 with the tray element removed and with the shell-engaging jaws shown in opened position.
Figure 5:
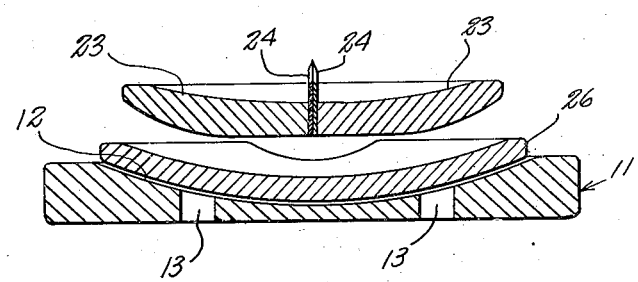
Figure 5 is a transverse vertical cross-sectional view taken on line 5—5 of Figure 1.

In operation, the egg is held in one hand and is brought downwardly over the abutting blades 24, 24 so that said blades crack the shell and penetrate into the peripheral portion of the egg. The egg is pressed down lightly on the cup elements 23, 23 and with the other hand the handle members 22, 22 are squeezed together, as shown in Figure 4, thereby spreading the cup elements 23, 23 apart, and causing the blades 24, 24 to open the egg shell in a manner which prevents breakage of the egg yolk. When the tray member 26 is employed, as in Figures 1, 2 and 5, the egg contents fall into said tray member. The tray member and egg contents may then be removed.

When the tray member 26 is not employed, as in Figure 4, the egg contents drop into the perforated bowl portion 12, and the egg white drains off into a suitable receptacle held beneath the apparatus, the yolk remaining in the center of said bowl portion, as above described. The yolk may then be removed into another receptacle prior to releasing the handle members 22, 22.

The various component parts of the device may be fabricated from any suitable material, such as metal, plastic, ceramic, or the like.

While a specific embodiment of an egg separating device has been disclosed in the foregoing description, it will be understood that various modifications within the spirit of the invention may occur to those skilled in the art. Therefore it is intended that no limitations be placed on the invention except as defined by the scope of the appended claim.

What is claimed is:

An egg breaker and separator of the kind described comprising a shallow upwardly concave base formed with a plurality of arcuate slots substantially concentric to the center of the base, a pair of upwardly opening confronting shallow cup segments, an extension on one side of said base, a handle on each of said cup segments pivoted on said extension for normally disposing said cup segments over said slots, a spring on said handles for biasing said cup segments into confronting engagement, and an upstanding flat blade fixed on the abutting edges of said cup segments and extending along the length thereof, whereby an egg-shell broken upon said blades will be contained on said cup segments upon separation thereof for dropping the meat onto the said base.

WILLIAM H. COOK.

REFERENCES CITED

The following references are of record in the file of this patent:

UNITED STATES PATENTS

| Number | Name | Date |
|---|---|---|
| 1,102,780 | Mezei et al. | July 7, 1914 |
| 1,918,463 | Foster | July 18, 1933 |